Aug. 8, 1950 — P. LIM — 2,518,342
STORAGE ATTACHMENT FOR AUTOMOBILE BODIES
Original Filed April 20, 1943 — 2 Sheets-Sheet 1
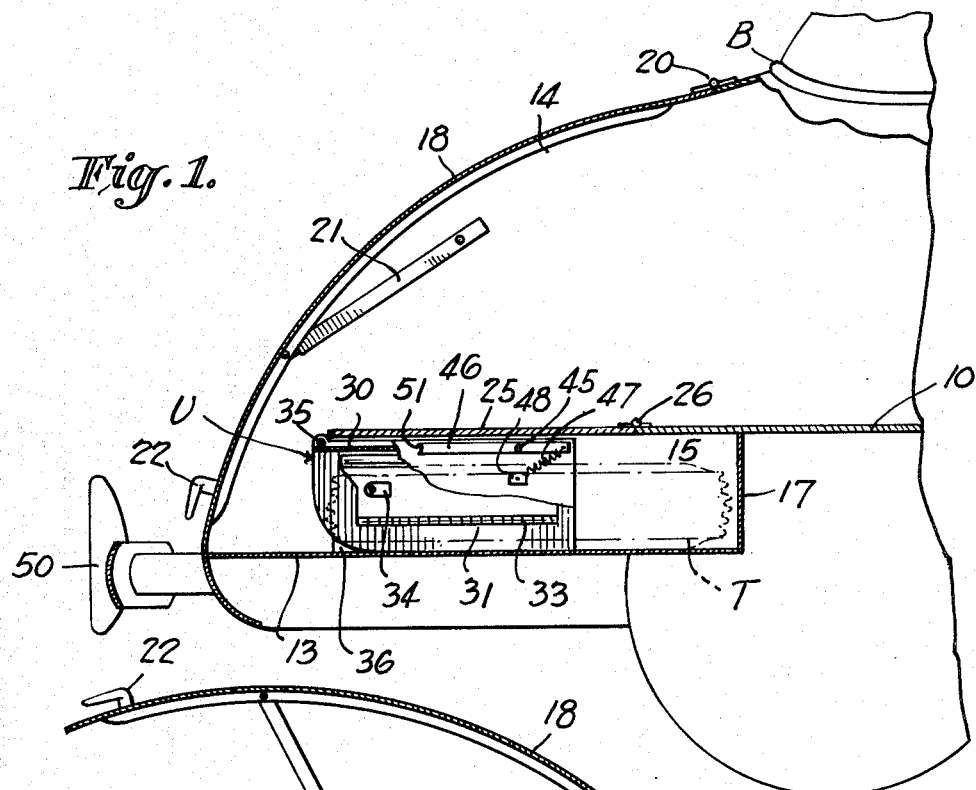
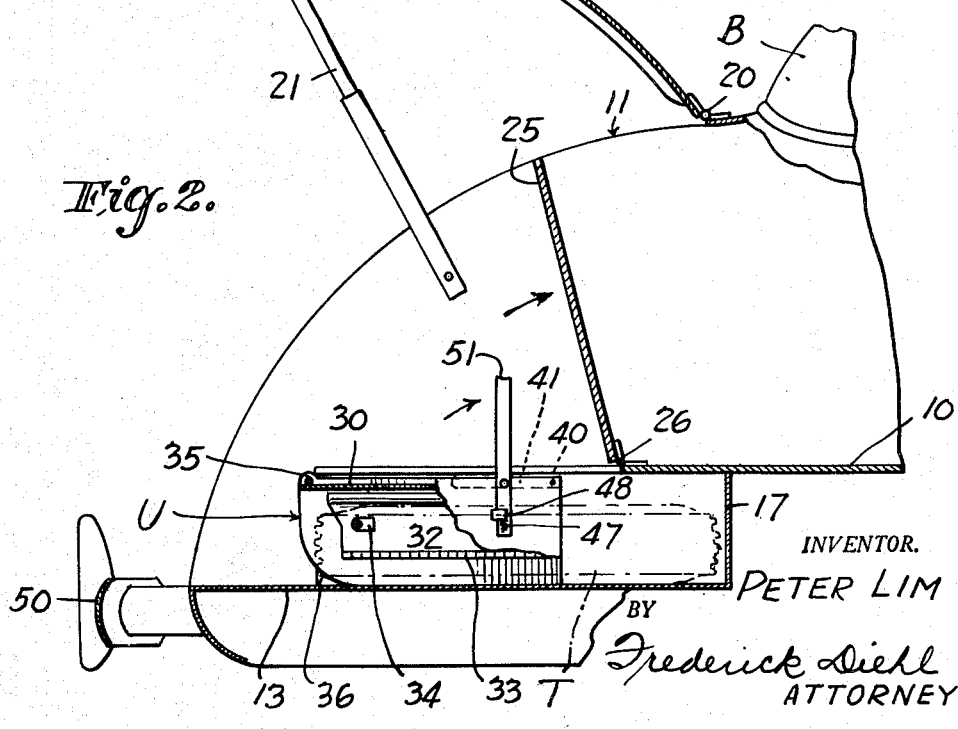
INVENTOR.
PETER LIM
BY Frederick Diehl
ATTORNEY

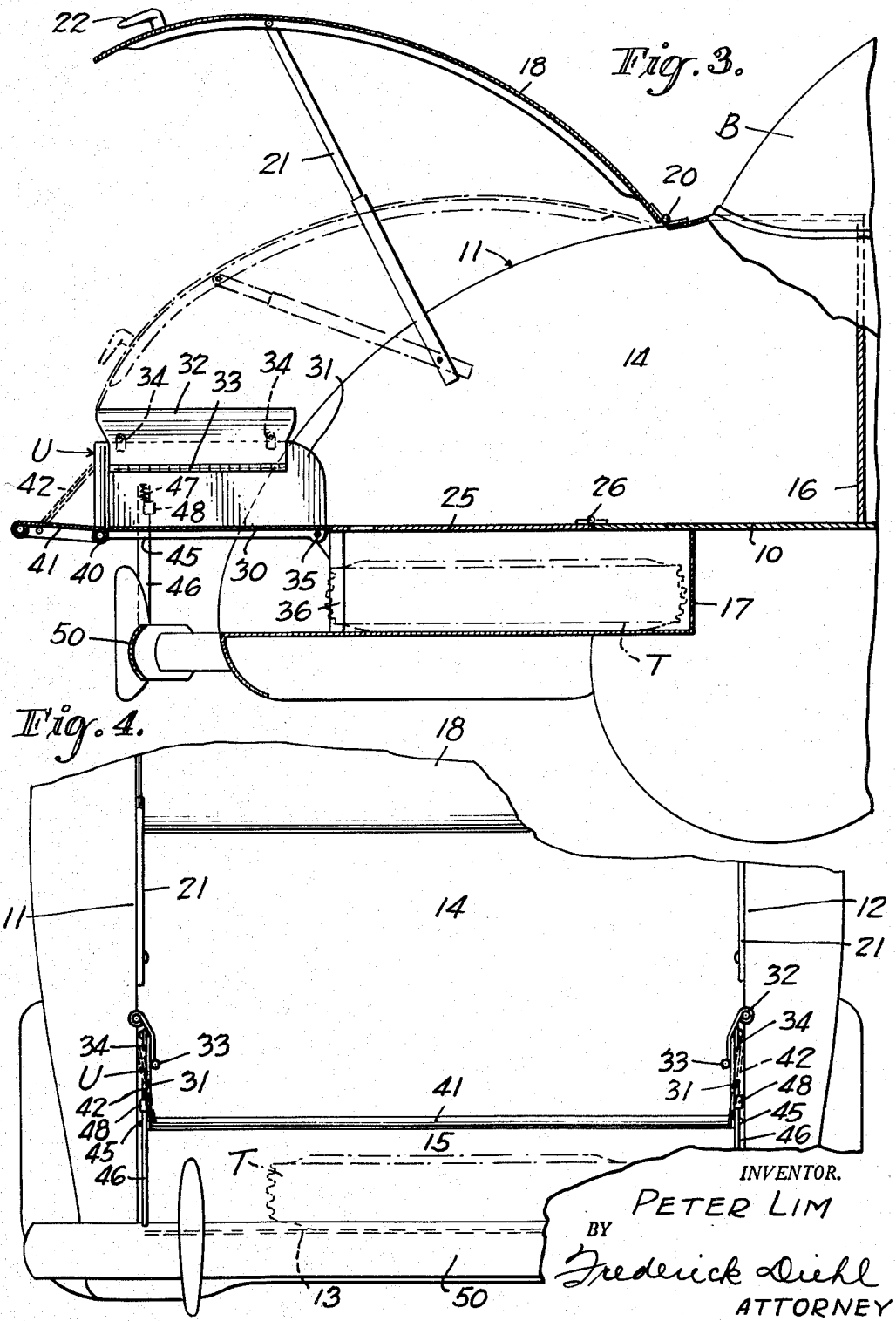

Patented Aug. 8, 1950

2,518,342

UNITED STATES PATENT OFFICE 2,518,342

STORAGE ATTACHMENT FOR AUTOMOBILE BODIES

Peter Lim, Los Angeles, Calif.

Continuation of application Serial No. 483,738, April 20, 1943. This application August 13, 1946, Serial No. 690,115

12 Claims. (Cl. 296—26)

This application is a continuation of my application for patent on Vehicle, Serial No. 483,738, which was filed on April 20, 1943 and was officially allowed on February 18, 1946 and is now abandoned.

This invention relates generally to vehicles and more particularly to the bodies of pleasure type automobiles.

An object of this invention is to provide an automobile of the closed body type such as a coupe or sedan, which is structurally characterized by means enabling the capacity of the usual storage space at the rear of the body to be greatly increased so that relatively large loads can be conveniently and safely transported, all to the end of obviating the need for a separate trailer or commercial vehicle to accommodate such loads, and without in any manner changing the exterior appearance of the body, or reducing the normal capacity of the storage space when the invention is not in use.

A further object of the invention is to provide a storage unit which is particularly adapted, although not necessarily, for use with an automobile body constructed to form an upper storage compartment and a lower compartment adapted to accommodate a spare tire, with the storage unit adjustably mounted to either project from the rear of the body to rearwardly prolong the upper storage compartment and thus greatly increase the capacity thereof, or to be disposed in the lower compartment in such manner as to leave the entire normal capacity of the upper compartment available, and yet not interfere with the storing of the tire in the lower compartment.

Another object of the invention is to provide a storage unit of comparatively simple, inexpensive and durable construction capable of being installed at relatively small cost in automobile bodies of conventional construction with but slight modification of the latter.

With these and other objects in view, the invention resides in the combinations, arrangements and functional relationships of elements as set forth in the following specification and particularly pointed out in the appended claims.

In the accompanying drawings,

Figure 1 is a vertical longitudinal sectional view of the rear portion of a coupe type of automobile body with the invention installed therein and occupying its inactive position in the spare tire compartment;

Figure 2 is a view similar to Figure 1 and illustrating the initial step in the operation of adjusting the invention to its active position;

Figure 3 is a view similar to the preceding figures and illustrating the invention fully adjusted to its active position; and Figure 4 is a rear elevation of the automobile body with the parts of the invention in the position shown in Figure 3.

Referring specifically to the drawings, the invention in its present embodiment is shown associated with a conventional pleasure type automobile body B such as a coupe or sedan model, having a horizontal partition or floor 10 coacting with side walls 11 and 12 and a sub floor 13 to divide the body rearwardly of its seats into an upper compartment or storage space 14 and a lower compartment 15 therebelow, for the storing of a spare tire T in the horizontal position shown.

The forward ends of the compartments 14 and 15 are closed by front walls 16 and 17 respectively, and their rear ends are open for convenient access to their contents from the rear of the body. A closure or lid 18 pivotally mounted at 20 on the body, is adapted to close the compartments, as will be clear from Figure 1. Suitable telescopic braces 21 are provided to releasably retain the closure 18 in its open position shown in Figures 2 and 3, and a lock 22 is provided to secure the closure in its closed position, all of which is well known in the art.

For the purpose of this invention, the rear portion 25 of the floor 10 is hinged at 26 at its forward end to the immediately adjacent part of the floor, to occupy the lowered and floor forming position shown in Figures 1 and 3, or the raised position shown in Figure 2, all for co-action with a storage unit embodying this invention and designated generally at U.

The storage unit U is preferably constructed of sheet metal to provide a flat bottom 30 from which rise sides 31 having side extensions 32 hinged at 33 and adapted to be releasably retained in the raised position shown in Figure 3 by pivoted latches 34, to increase the height of the sides.

At its lower forward corners, the storage unit U is pivotally mounted by pins 35 on brackets 36 rigidly secured in the body B at its side walls 11 and 12 and also serving to support the rear end of the movable floor portion 25 in its floor forming position. This pivotal mounting of the unit U enables it to be adjusted to occupy either the upright position shown in Figure 3, wherein the bottom 30 is at the level of the floor 10 so as to form a rearward continuation of the latter, and the sides 31 to form rearward continuations of the side walls 11 and 12 of the body, or the inverted position shown in Figures 1 and 2 wherein the unit is disposed in the tire compartment 15, all in a manner to be later more fully described.

Hinged to the lower rear corners of the unit U at 40 is a tail gate 41 adapted to be suspended in its tail gate forming position shown in Figure 3 by suitable chains 42, or to be swung outwardly against and parallel with the bottom 30 when the unit is to be moved to its inverted position.

Pivotally mounted between their ends at 45 on the sides 31 are legs 46. Springs 47 normally urge the legs against stops 48 to a supporting position shown in Figures 2 and 3 wherein the legs project at a right angle from the bottom 30 at locations to rest upon the bumper bar 50 or other supporting structure of the vehicle. The legs have their lower extremities notched at 51 to seat securely upon the bar as shown in Figure 3, to thus rigidly support the unit U in its upright or active position.

The operation of the invention is as follows:

Let it be assumed that the unit occupies its inverted position in the compartment 15 as shown in Figure 1, from which it will be noted that the tire T is readily accommodated between the sides 31 of the unit, and the legs 46 are held by the movable floor portion 25 in a non-supporting position parallel to the bottom 30, against the action of the springs 47. With the unit U in this position, unrestricted access to the two compartments 14 and 15 can be had upon raising the closure 18. As the unit is entirely removed from the storage space formed by the upper compartment 14, the normal capacity of the latter is not reduced by the unit.

When it is desired to increase the capacity of the storage space 14, the movable floor portion 25 is raised to the position shown in Figure 2, thus releasing the legs 46 for movement by the springs 47 to the supporting position shown in this figure. In this raised position, the movable floor portion 25 will be clear of the path of movement of the unit U in swinging the latter upwardly and rearwardly to its upright position shown in Figure 3 wherein the legs 46 rest upon the bumper bar 50 to form a rigid support for the unit.

The movable floor portion 25 is now restored to its floor forming position to provide a continuous floor at one and the same level to the rear end of the bottom 30 of the unit U as clearly shown in Figure 3. The side extensions 32 can be raised and latched by the latches 34 to increase the height of the sides 31, and the tail gate 41 suspended by the chains 42 to extend the bottom 30 rearwardly a distance equal to the height of the tail gate.

In its upright position, the bottom 30 and sides 31 of the unit U form rearward continuations of the floor 10 and side walls 11, 12 of the body B, thus greatly increasing the load carrying capacity of the storage space 14 beyond its normal capacity. The closure 18 can be lowered to rest upon the side extensions 32 or upon the sides 31 should the extension not be used, to thus form a protecting roof over the load. It will be clear that by reversing the order of the steps in the above described operation, the unit can be quickly adjusted to its inactive position shown in Figure 1, to entirely clear the storage compartment 14 and permit the closure 18 to be fully closed so as to restore the body B to its conventional appearance.

It will be understood that although the movable portion 25 of the partition or floor 10 has been illustrated and described as being permanently and pivotally connected to the body B, such portion can be a separate section removable from the body so as to permit the portion 25 to be lifted out of the way when adjusting the unit U, and to be replaced and seated in its floor forming position shown in Figures 1 and 3 when adjustment of the unit to active or inactive position is completed.

Furthermore, it will be noted that in the inactive position of the unit U, the tail gate rests flatly upon the inverted bottom wall 30 of the unit, and serves as a convenient means which can be grasped by the hands to swing the unit upwardly and rearwardly to its active position as well as returned to its inactive position. By thus resting upon the bottom between the sides 31 as shown in Figure 2, the tail gate 41 and all other parts of the unit are entirely clear of the tire T, and the size of the door 25 necessary to permit adjustment of the unit, is reduced to a minimum.

I claim:

1. In a vehicle, in combination: a body having a floor and side walls rising therefrom for co-action therewith in defining a rearwardly opening storage space above the floor; a storage unit in the body; means mounting said unit for adjustment in a predetermined path to occupy one position wherein the unit forms a rearward continuation of the storage space so as to enlarge its capacity, and a second position wherein the unit is disposed within the body and below the floor so as to be entirely clear of the storage space and thus not reduce the normal capacity of the latter; said floor having a movable portion; and means pivotally mounting said movable portion about a fixed axis in the body, extending transversely of the length of the body from a floor forming position overlying said unit when occupying its second mentioned position, to a position clear of said unit when being adjusted from one position to the other.

2. In a vehicle, in combination: a body having means including a partition dividing it into upper and lower compartments; a storage unit; means mounting said unit to be swingable about a pivot in the body to upright and inverted positions, in which upright position said unit forms a rearward continuation of the upper compartment, whereas in said inverted position said unit is disposed in the lower compartment; said partition having a portion thereof overlying said unit when the latter is inverted, and means mounting said portion for movement to clear the path of movement of the unit from one to the other of its positions; and a closure mounted on the body to close said compartments.

3. In a vehicle, in combination: a body having means including a partition dividing it into upper and lower compartments; a storage unit; means mounting said unit to be swingable about a pivot in the body to upright and inverted positions, in which upright position said unit forms a rearward continuation of the upper compartment, whereas in said inverted position said unit is disposed in the lower compartment; means mounting a portion of said partition in the body for pivotal movement to a raised position at a location relative to the unit enabling such portion to be raised clear of the path of movement of said unit from one position to the other; and a closure mounted on the body to close said compartments.

4. In a vehicle, a vehicle body having a floor and side walls rising therefrom for co-action therewith in dividing the body into upper and lower compartments; a storage unit including a bottom and sides projecting therefrom; means pivotally mounting said unit for adjustment to occupy an upright position wherein the bottom and sides of the unit form rearward extensions of said floor and side walls, respectively, or an inverted position in said lower compartment wherein the sides of said unit are adapted to straddle a tire in said lower compartment; means pivotally mounting a portion of the floor for movement from a floor forming position to a raised position out of the path of pivotal adjustment of the storage unit; and a closure mounted on the body to close said compartments.

5. In a vehicle, in combination: a body having means dividing it into upper and lower compartments; a storage unit; means mounting said unit to be swingable about a pivot to upright and inverted positions, in which upright position said unit forms a rearward extension of the upper compartment, whereas in said inverted position said unit is disposed in the lower compartment; legs movably mounted on the storage unit; means urging said legs to a supporting position wherein they project from the bottom of the storage unit for co-action with supporting structure of the vehicle in supporting the storage unit in its first mentioned position; means by which said legs can be moved to a non-supporting position in the lower compartment when said unit is inverted therein; and a closure for said compartments, mounted on the body.

6. In a vehicle, a vehicle body having a floor and side walls rising therefrom for co-action therewith in dividing the body into upper and lower compartments; a storage unit including a bottom and sides projecting therefrom; means pivotally mounting said unit for adjustment to occupy an upright position wherein the bottom and sides of the unit form rearward extensions of said floor and side walls, respectively, or an inverted position in said lower compartment wherein the sides of said unit are adapted to straddle a tire in said lower compartment; means pivotally mounting a portion of the floor for movement from a floor forming position to a raised position out of the path of pivotal adjustment of the storage unit; legs pivotally mounted on the sides of the storage unit; springs urging the legs to project from the bottom of the unit for co-action with a supporting structure of the vehicle in supporting the storage unit in its upright position; said legs being disposed to be cammed by said pivoted floor portion to a non-supporting position when the storage unit occupies inverted position and said portion is lowered to floor forming position; and a closure mounted on the body to close said compartments.

7. In a vehicle body of the type including a floor dividing the body into a rearwardly opening storage compartment and a tire compartment therebelow, a storage unit having a bottom and sides; means including a pivotal mounting of said unit on the body, for adjustment of the unit to occupy an upright position wherein the unit forms a rearward extension of the storage compartment, and an inverted position in the tire compartment, wherein the bottom of the unit is adapted to overlie a tire in such compartment, with the sides of the unit accommodating the tire therebetween; and means mounting a portion of the floor for movement to a non-obstructing position with respect to said unit when being adjusted as aforestated.

8. In a vehicle, in combination: a body having means including a partition dividing it into upper and lower compartments; a storage unit having sides; means pivotally mounting said unit for movement to occupy an upright position wherein the unit forms a rearward extension of the upper compartment, and an inverted position in the lower compartment; said partition having a portion thereof overlying said unit when inverted, and being movable to clear the path of movement of the unit from one to the other of its positions; said unit including a tail gate co-operable with the sides of the unit; means pivotally mounting the tail gate to occupy a working position wherein the tail gate forms a rearward continuation of the bottom of the unit and is co-actable with the sides of the unit to close the back thereof when the unit is upright, or rests upon the bottom of the unit when inverted, and adapted to be grasped to manipulate the unit to one position or the other; and a closure mounted on the body to close said compartments.

9. A storage attachment adapted for installation in an automobile body having a rearwardly opening storage space and a closure adapted to normally close the storage space, said storage attachment comprising: a storage unit; means defining a floor for said space and including a portion pivotally mounted about a fixed axis; and means mounting said floor and storage unit in the automobile body for said unit to occupy upright and inverted positions, in which upright position said unit forms a rearward continuation of said floor, whereas in said inverted position said unit is disposed within the body and below the floor so as to be entirely clear of the storage space and thus not reduce the normal capacity of the latter; said pivoted floor portion being movable from a floor-forming position overlying said unit when occupying its second mentioned position, to a position out of the path of adjustment of said unit.

10. A storage attachment adapted for installation in an automobile body having a rearwardly opening storage space and a closure adapted to normally close the storage space, said storage attachment comprising: a storage unit; means defining a partition dividing said storage space into upper and lower compartments, and having a movable portion; and means mounting said partition and said storage unit in the body, for said unit to occupy upright and inverted positions, in which upright position said unit forms a continuation of said partition, whereas in said inverted position said unit is disposed in the lower compartment; said portion of the partition being located relative to said unit to overlie the latter when inverted, and being movable to clear the path of movement of the unit from one to the other of its positions.

11. A storage attachment adapted for installation in an automobile body having a storage space and a closure therefor, said attachment comprising: a partition dividing said storage space into upper and lower compartments closed by said closure; a storage unit; means mounting said unit in said body to occupy upright and inverted positions, in which upright position said unit forms a rearward continuation of the upper compartment, whereas in said inverted position said unit is disposed in the lower compartment; and means mounting a portion of said partition for pivotal movement to a raised position enabling such portion to be raised clear of the path of movement of said unit from one position to the other.

12. A storage attachment adapted for installation in an automobile body having a storage space and a closure therefor, said storage attachment comprising: a partition dividing said storage space into upper and lower compartments closed by said closure; a storage unit having sides; means mounting said unit in said body to occupy an upright position wherein the unit forms a rearward extension of the upper compartment, and an inverted position in the lower compartment; said partition having a portion thereof overlying said unit when inverted, and means mounting said portion in the body for movement in a predetermined path to clear the path of movement of the unit from one to the other of its positions; said unit including a tail gate cooperable with the sides of the unit; and means pivotally mounting said tail gate on the unit at a location to rest upon the bottom of the unit when inverted, and adapted to be grasped to manipulate the unit to one position or the other.

PETER LIM.

REFERENCES CITED

The following references are of record in the file of this patent:

UNITED STATES PATENTS

| Number | Name | Date |
| --- | --- | --- |
| 1,655,797 | Peck | Jan. 10, 1928 |
| 2,160,958 | Critchlow | June 6, 1939 |
| 2,230,334 | Roberts | Feb. 4, 1941 |
| 2,246,813 | Preston | June 24, 1941 |
| 2,321,239 | Pond | June 8, 1943 |